Patented June 26, 1951

2,558,273

UNITED STATES PATENT OFFICE 2,558,273

1.2-IMINOCYCLOHEXANES

Hans Schläpfer and Alfred Margot, Basel, Switzerland, assignors to J. R. Geigy A. G., Basel, Switzerland, a Swiss firm No Drawing. Application November 28, 1949, Serial No. 129,876. In Switzerland December 3, 1948

6 Claims. (Cl. 260—239)

The present invention is concerned with new 1.2-iminocyclohexanes and their manufacture.

Because of their great reaction capabilities, the very well known 1.2-alkylene imines, such as ethylene imine, are valuable intermediate products in the synthesis of organic chemistry, for example for textile auxiliary products and pharmaceuticals. On the other hand, the 1.2-iminocyclo hexanes have not become known. This is possibly because the former are obtained from β-halogen alkylamines by the reaction of strong alkalis with the splitting off of halogen hydride, whereas experiments show that under the same reaction conditions the 1.2-imino cyclo hexanes do not form from 2-halogen-1-amino-cyclo-hexanes. This invention now gives the process for the manufacture of the hitherto unknown 1.2-imino cyclo hexanes.

It was found that, by the action of strong alkalis on the aqueous solution of the acid sulphuric acid esters of 1-primary or secondary amino-2-hydroxy-cyclo-hexanes of the general Formula I at a raised temperature, a good yield of 1.2-imino cyclo hexanes of the general Formula II according to the equation:

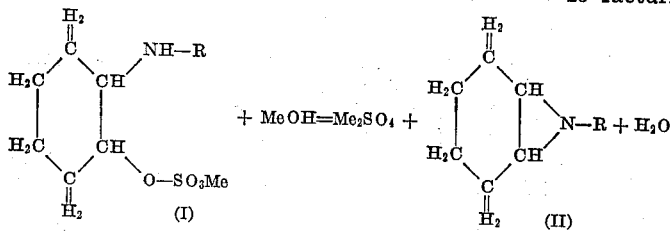

was obtained, in which

R means hydrogen or an alkyl-, cycloalkyl-, aralkyl-, or aryl radical, and

Me means the cation of a strong base, and the cyclohexane ring can also contain alkyl substituents.

According to the invention, the usable sulphuric acid half esters from primary, and from secondary o-hydroxyamino compounds of the cyclohexane series by the substitution of alkyl cyclo-alkyl-, aralkyl-, or aryl groups, can easily be obtained by sulphonation with chlorosulphonic acid or oleum of the corresponding amino-hydroxy-cyclo hexane or the homologs substituted by alkyl in the cyclohexane ring respectively. The o-hydroxyamino compounds of the cyclohexane series can be produced by reacting o-hydroxy-halogen compounds with ammonia or amines.

A process for the manufacture of alkylene imines by the reaction of strong alkalis in an aqueous medium at a raised temperature on the acid sulphuric acid esters of 1.2-hydroxyamino alkanes is already known. The application of this reaction to 1.2-hydroxyamino-cyclohexanes or their acid sulphur acid ester respectively was, however, not directly thought possible because the splitting off of the sulphate radical in the cyclohexane derivative, caused through the strong bases, could equally well occur with a hydrogen atom of an adjacent carbon atom instead of with a hydrogen atom of the amino group in the formation of a cyclohexene derivative.

The new 1.2-iminocyclohexanes are colourless liquids with a weak basic odour or low melting solids; depending on their composition the simplest members of the series dissolve in water. As a result of the reactivity of the imino three-membered ring, the new compounds are very well suited as intermediate products in the manufacture of textile auxiliary products, dyestuff intermediate products and pharmaceuticals.

The following examples illustrate the manufacturing process of the new compounds. The parts are parts by weight and the temperatures are given in degrees centigrade. The relationship of parts by weight to parts by volume is that of kilograms to litres.

Example 1

195 parts of 2-amino-cyclohexanol sulphuric acid ester are added to 560 parts of 30% caustic soda lye while stirring. In an oil-bath, the thick paste is then heated to boiling. The imine so formed is condensed together with the water in a condenser, whereby ca. 500 parts by volume of distillate are obtained. To separate the imine, caustic soda is added to the distillate while cooling, whereupon the oily base quickly separates. After separation of the aqueous lye and drying of the oil over caustic potash, the dried oil is fractionated in the vacuum. In this manner 80 parts of 1.2-imino-cyclohexane (82.5 of the theoretical) are obtained as a colourless liquid with a basic odour. Boiling point: 74-76° at 60 mm. pressure.

On cooling off the 1.2-iminocyclohexane forms beautiful crystals which melt at 21.5-22°.

If in place of the 30% caustic soda lye, a corresponding amount of caustic potash or calcium hydroxide is used, with a similar method it is possible to obtain good yields of 1.2-iminocyclohexane.

*Example 2*

209 parts of 4-methyl-2-amino-cyclohexanol sulphuric acid ester (Bull. soc. chim. France 1947, 857) are mixed into 560 parts of 30% caustic soda lye. The reaction mixture is then heated to boiling whereby the imine quickly separates as an oily layer on the reaction solution. Distillation is performed with a condenser and by the addition of caustic potash the imine is separated from the aqueous condensate. It is isolated and dried for a few hours over caustic potash. On distillation in the vacuum, good yields of 4-methyl-1.2-iminocyclohexane are obtained. Boiling point: 72.5-74° at 39 mm. pressure.

In a similar manner, other 2-aminocycle-hexanol-sulphuric acid esters, which are substituted by higher alkyl radicals in the cyclohexane ring can be transformed in good yields into the correspondingly substituted 1.2-iminocyclohexanes.

*Example 3*

209 parts of 2-methylamino-cyclohexanol sulphuric acid ester are added to 560 parts of 30% caustic soda lye while stirring (Bull. soc. chim. France, 1947, 851) and the reaction mixture is heated slowly to boiling. With the increasing temperature, the sodium salt of the sulphuric acid ester dissolves and on reaching the boiling point, N-methyl-1.2-iminocyclohexane is formed. This is distilled with a condenser until no more basic constituents can be obtained. The greater part of the undissolved base is separated out of the distillate, the substance dissolved in water is eliminated in the usual way with caustic soda and the raw basic components are combined. After dehydration over powdered caustic potash, the base is rectified in the vacuum. Good yields of N-methyl-1.2-iminocyclohexane (77.5 of the theoretical) are obtained as a colourless liquid. Boiling point: 65-67° at 92-93 mm. pressure.

*Example 4*

237 parts of 2-n-propylamino-cyclohexanol sulphuric acid ester are added to a mixture of 560 parts of 30% caustic soda lye and 125 parts of water (Bull. soc. chim. France, 1947, 852). This is then slowly heated to boiling and the procedure given in Example 3 followed. The isolation is carried out as described in the preceding examples. In this manner 89 parts of N-n-propyl-1.2-iminocyclohexane (63.5% of the theoretical) are obtained. Boiling point: 77-79° at 31-32 mm. pressure.

*Example 5*

To 475 parts of caustic soda lye, obtained by mixing 375 parts of 30% caustic soda lye with 100 parts of water, are added, while stirring, 184 parts of 2-n-octylamino-cyclohexanol sulphuric acid ester (produced by the reaction of 2-aminocyclohexanol with octyl bromide at 150-160°; boiling point: 161-162° at 12 mm. pressure). On slowly heating while stirring a clear solution of sulphuric acid ester is formed. At about 90° the imine begins to separate. After boiling for half an hour under reflux, the reaction is complete. The imine, which forms an oily layer, is separated, dried over caustic potash and distilled in the vacuum. Good yields of N-n-octyl-1.2-iminocyclohexane (65% of the theoretical) are obtained as a colourless liquid. Boiling point: 122.5-125° at 12 mm. pressure.

*Example 6*

277 parts of 2-cyclohexylamino-cyclohexanol sulphuric acid ester (Bull. soc. chim. France, 1947, 852) are heated slowly to boiling while stirring, with a mixture of 560 parts of 30% caustic soda lye and 200 parts of water. Shortly before the boiling point the imine begins to separate from the solution. After boiling the reaction solution for half an hour under reflux, the reaction mixture is worked up in the manner given in Example 5. 131 parts of N-cyclohexyl-1.2-iminocyclohexane (73% of the theoretical) are obtained as a colourless liquid. Boiling point: 109-110° at 14 mm. pressure.

If, instead of 2-cyclohexylamino-cyclohexanol sulphuric acid ester, the 2-methylcyclohexyl-amino-cyclohexanol sulphuric acid ester is taken as the starting material and the usual procedure is followed, a product with similar qualities is obtained.

*Example 7*

145 parts of 2-benzylamino-cyclohexanol sulphuric acid ester (produced by reacting 2-aminocyclohexanol with benzyl chloride at 140-150°, melting point 66-67°) are added to 100 parts of water. To this mixture 280 parts of 30% caustic soda lye are added slowly whereby the sulphuric acid ester dissolves first but is salted out by the surplus lye. Following this, it is heated to boiling and boiled for half an hour under reflux, after which time the reaction is completed. Working up can be done as given in the above examples. A 72% yield of N-benzyl-1.2-iminocyclohexane is obtained as a colourless liquid. Boiling point: 112-113° at 4 mm. pressure.

Starting from 2-(p-methoxy-benzylamino)-cyclohexanol sulphuric acid ester, N-(p-methoxy-benzyl)-1.2-imino-cyclohexane is obtained in an analogous manner.

*Example 8*

A mixture of 150 parts of 2-phenylamino-cyclohexanol sulphuric acid ester, 150 parts of water and 300 parts of 30% caustic soda lye are reacted as shown in Example 7. The working up can also be carried out in a similar manner. N-phenyl-1.2-iminocyclohexane is obtained by distillation. Boiling point: 86-89° at 0.3 mm. pressure.

Similar products may be obtained by replacement of the above named o-hydroxyamino compound by 2-tolylamino- or 2-xylylamino-cyclohexanol sulphuric acid ester.

It is also possible to introduce an alkyl or aralkyl radical by subsequent treatment of 1.2-imino cyclohexane with suitable alkylating or aralkylating agents, as illustrated in the following examples:

*Example 9*

19.4 parts of 1.2-imino cyclohexane are heated with 12.6 parts of benzyl chloride. The reaction begins at about 80° whereby the temperature increases to 120° without external heating. To complete the reaction, the mixture is heated for 2 hours at 160-170°. The reaction product is made into a solution by treatment with ether and water and the separated ether layer is washed with diluted sodium hydroxide and water. After drying over sodium sulphate, the solvent is distilled off. On fractionating the residue, N-benzyl-1.2-imino cyclohexane is obtained as a colourless liquid with a boiling point of 138–140° at about 12 mm. pressure.

Example 10

A mixture of 10 parts of 1.2-imino cyclohexane, 25 parts of dodecyl bromide, 14 parts of potash and 50 parts of chlorobenzene are heated under reflux for 15 hours while stirring briskly. After cooling, the reaction mixture is diluted with ether, and the inorganic salts are drawn off by suction. The organic filtrate is washed with diluted soda and water and dried over sodium sulphate. After distilling off the solvent in the vacuum, N-dodecyl-1.2-imino cyclohexane is obtained as an oil which cannot be distilled without decomposing.

If 33 parts of octadecyl bromide are used in the place of dodecyl bromide, then N-octadecyl-1.2-imino cyclohexane is obtained in an analogous manner as a brownish semi-solid mass.

Example 11

49 parts of 1.2-imino cyclohexane are slowly heated in an autoclave with 22 parts of ethylene oxide. The reaction begins with liberation of heat at 110–115°, whereby the temperature rises to 125° and the pressure to 6 at. After a few minutes the pressure returns to normal. The reaction mixture is allowed to cool and the contents of the autoclave are fractionated. On distilling at 95–97° under 10 mm. pressure, a good yield of N-β-hydroxyethyl-1.2-imino cyclohexane is obtained as a colourless oil.

What we claim is:

1. A compound corresponding to the general formula:

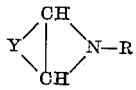

wherein

R represents a member selected from the group consisting of hydrogen, alkyl, monocyclic cycloalkyl, monocyclic aryl and monocyclic aralkyl radicals, and Y constitutes a hydrocarbon chain which completes a cyclohexane ring selected from the group consisting of cyclohexane and methylcyclohexane rings.

2. A compound corresponding to the formula

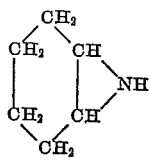

3. A compound corresponding to the formula

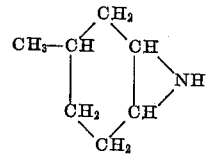

4. A compound corresponding to the formula

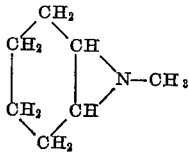

5. A compound corresponding to the formula

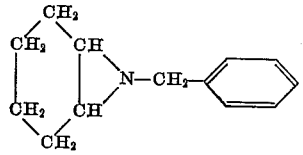

6. A compound corresponding to the formula

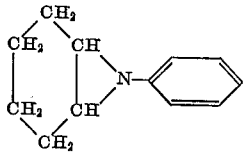

HANS SCHLÄPFER.
ALFRED MARGOT.

REFERENCES CITED

The following references are of record in the file of this patent:

UNITED STATES PATENTS

| Number | Name | Date |
|---|---|---|
| 2,206,273 | Ulrich | July 2, 1940 |
| 2,212,146 | Berchet et al. | Aug. 20, 1940 |

OTHER REFERENCES

Braun et al. I, Chem. Abst. vol. 23 (1929) p. 1131.

Braun et al. II, Chem. Abstract Decennial Index, vol. 21–30 (1927–1936 A. D.) 6-azobicyclo[3.1.1]heptane and formula, p. 3534.